United States Patent [19]
Ahn

[11] Patent Number: 5,784,344
[45] Date of Patent: Jul. 21, 1998

[54] DISC CHANGING DEVICE WITH LOCKING MOVABLE MEMBER FOR COMPACT DISC PLAYER

[75] Inventor: Chul Woong Ahn, Seoul, Rep. of Korea

[73] Assignee: Samsung Electronics Co., Ltd., Kyungki-do, Rep. of Korea

[21] Appl. No.: 555,408

[22] Filed: Nov. 9, 1995

[30] Foreign Application Priority Data

Nov. 11, 1994 [KR] Rep. of Korea .................. 94-29850

[51] Int. Cl.$^6$ ................................................ G11B 17/22
[52] U.S. Cl. .................. 369/36; 369/34; 369/75.2; 369/191
[58] Field of Search .................. 369/36, 34, 75.2, 369/77.1, 178, 191, 192; 360/98.04, 98.05, 98.06

[56] References Cited

U.S. PATENT DOCUMENTS

| | | | |
|---|---|---|---|
| 5,235,568 | 8/1993 | Masaru | 369/2 |
| 5,384,760 | 1/1995 | Kumakura | 369/36 |
| 5,459,703 | 10/1995 | Tanaka | 369/36 |
| 5,504,733 | 4/1996 | Nakamichi | 369/36 |

FOREIGN PATENT DOCUMENTS 1-224969  9/1989  Japan .
2275361   8/1994  United Kingdom .................. 369/191

Primary Examiner—Stuart S. Levy
Assistant Examiner—Kevin M. Watkins
Attorney, Agent, or Firm—Sughrue, Mion, Zinn, Macpeak & Seas, PLLC

[57] ABSTRACT

A disc changing device for a compact disc player including a tray box containing a plurality of stacked trays, the tray box being mounted in a body of the compact disc player such that it is vertically movable, and a door member mounted to the player body such that it is forwardly ejected out of the player body and rearwardly inserted into the interior of the player body by a drive power from a motor along with a selected one of the trays to carry out a disc change. The tray box is disposed at a position corresponding to a front portion of the door member completely inserted into the player body. A movable member is disposed on the door member such that it is slidable to move a selected one of the trays between the front portion of the door member and a deck of the compact disc player disposed rearwardly of the door member. A locking member is pivotably mounted on the door member to prevent the tray selected for the disc change from being moved on the door member when the door member is forwardly ejected out of the player body. The locking member is adapted to lock the movable member at the front portion of the door member when the door member is ejected while releasing its locking function when the door member is completely inserted into the interior of the player body.

6 Claims, 4 Drawing Sheets

DISC CHANGING DEVICE WITH LOCKING MOVABLE MEMBER FOR COMPACT DISC PLAYER

BACKGROUND OF THE INVENTION

1. Field of the Invention

The present invention relates to a disc changing device for compact disc players, and more particularly to a disc changing device for a compact disc player which is capable of changing a disc even when a compact disc is being played.

2. Description of the Related Art

Conventional compact disc players have a construction including a deck disposed at the front portion of the disc player and a tray box disposed at the rear portion of the disc player. A plurality of stacked trays are contained in the tray box. The tray box is movable in a vertical direction.

When a selected one of various compact discs contained in the tray box are changed in conventional compact disc players, the deck is moved downward to its unloading position. At this state, a door is opened to replace a compact disc with a new one. The new compact disc is then stored in the tray box or loaded on the deck. For the loading and door opening operations, the tray box should be moved to the desired vertical position by a lifting mechanism.

In conventional compact disc players, however, the door can be opened only when the deck is in its unloaded state. In other words, the door can not be opened during the playback operation. As a result, it is impossible to carry out a disc operation while the disk is being played.

When one of the various compact discs stored in the tray box must be changed while another compact disc is being played back, therefore, the driving state of the deck must be stopped. This means that the user can not change discs while still listening to the music currently being played. Furthermore, it is impossible to listen to new music immediately after changing discs.

SUMMARY OF THE INVENTION

Therefore, the present invention has been made in view of the above-mentioned problem involved in the prior art and an object of the invention is to provide a disc changing device for a compact disc player which can change a disc even when a compact disc is being played, thereby providing a more convenient compact disc player for users.

In accordance with the present invention, this object is accomplished by providing a disc changing device for a compact disc player comprising a tray box containing a plurality of stacked trays, the tray box being mounted in a body of the compact disc player such that it is vertically movable, and a door member mounted to the player body such that it is forwardly ejected out of the player body and rearwardly inserted into the interior of the player body by a motor along with a selected one of the trays to carry out a disc change operation, wherein the improvement comprises: the tray box being disposed at a position corresponding to the front portion of the door member completely inserted into the player body; a movable member disposed on the door member such that it is slidable, the movable member being adapted to move a selected one of the trays between the front portion of the door member and a deck of the compact disc player disposed rearwardly of the door member; and locking means for preventing the tray selected for the disc change from being moved on the door member when the door member is forwardly ejected out of the player body.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
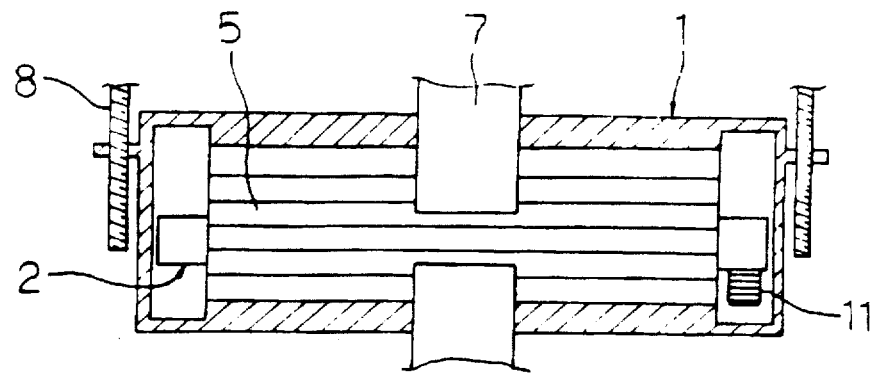
FIG. 1 is a sectional view schematically illustrating a disc changing device for a compact disc player in accordance with the present invention.
Figure 2:
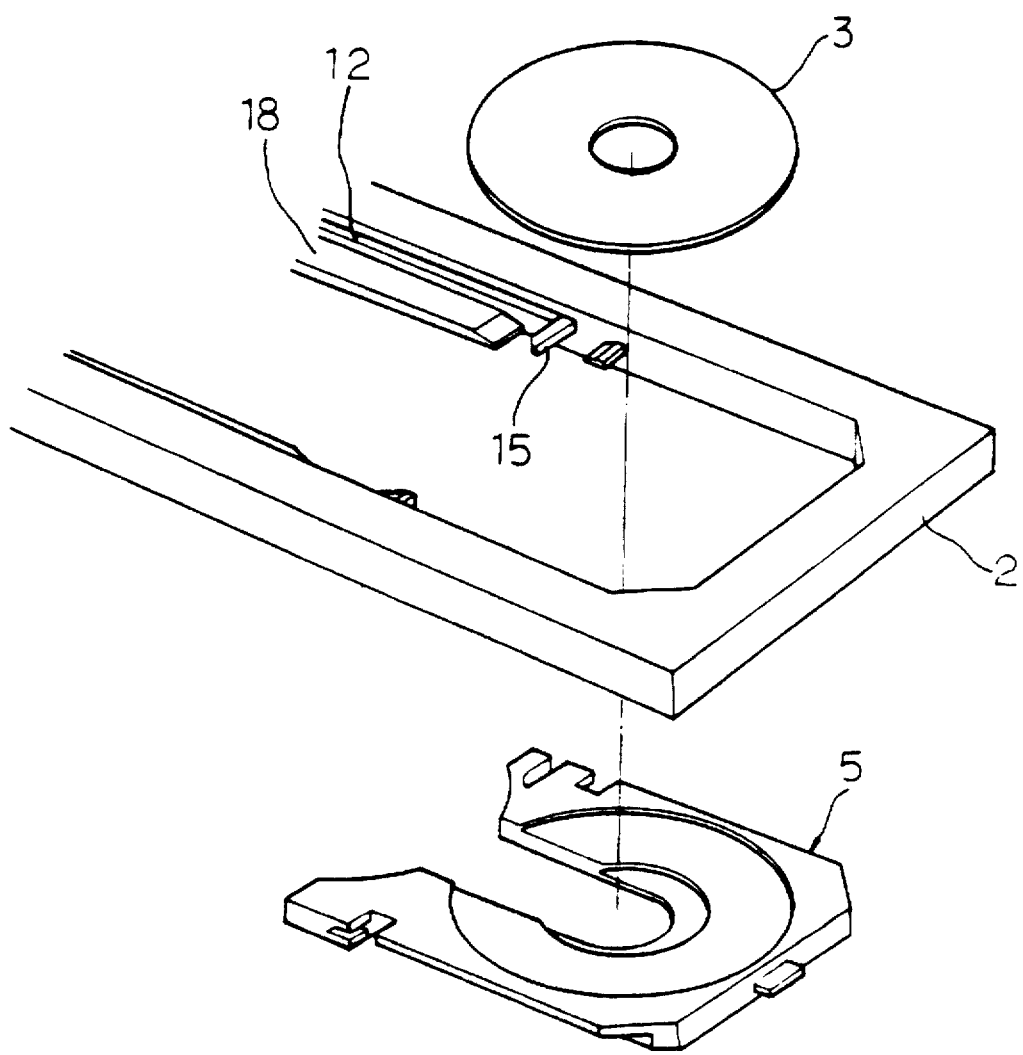
FIG. 2 is an exploded perspective view illustrating a door member included in the disc changing device of FIG. 1.
Figure 3:
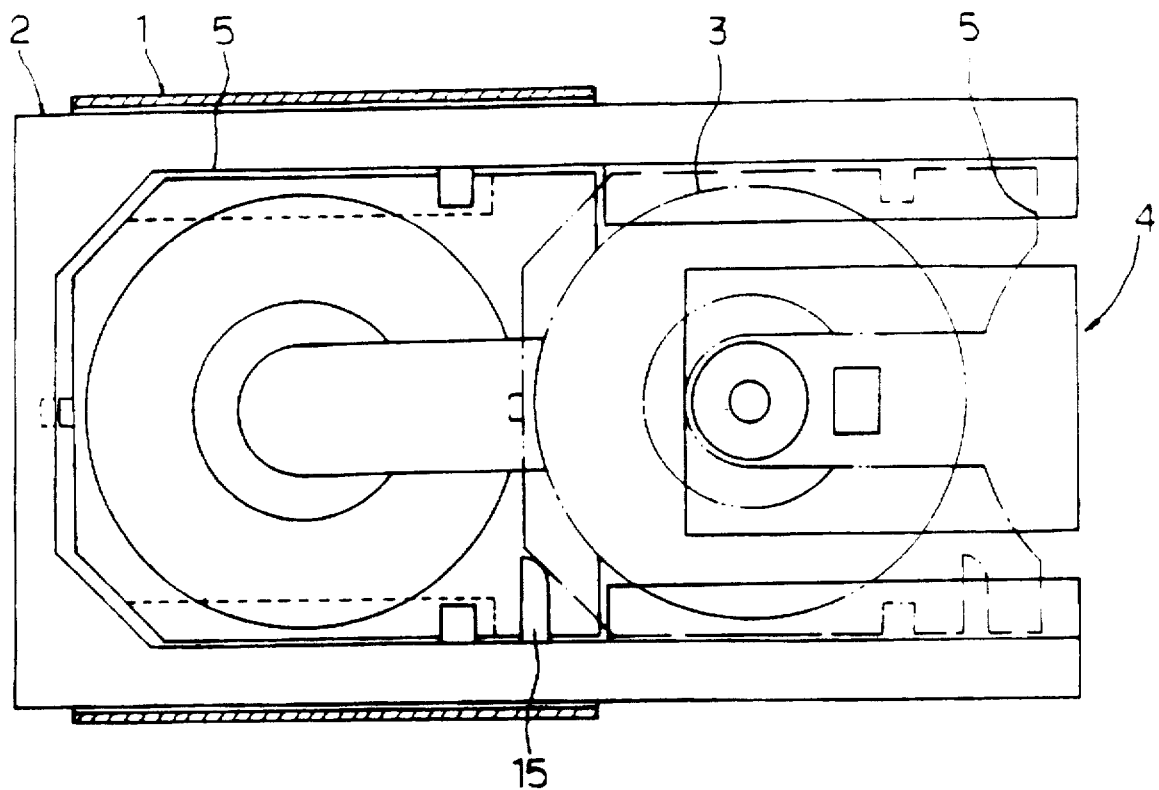
FIG. 3 is a partially-sectioned plan view of the disc changing device shown in FIG. 1, showing different operation positions.
Figure 4:
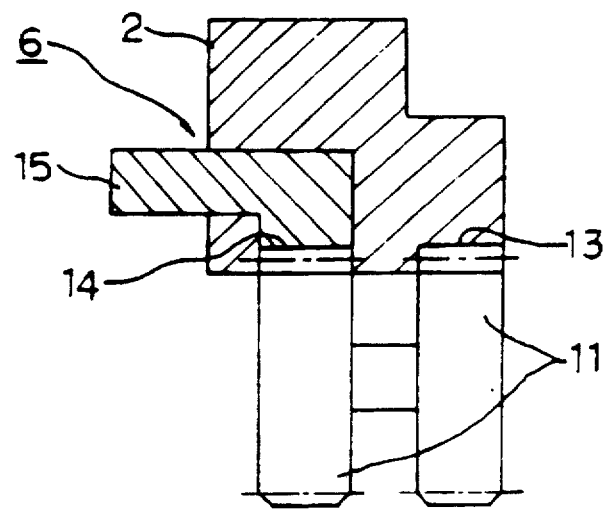
FIG. 4 is a sectional view illustrating a part of the door member coupled with other members.

FIGS. 1 to 6 illustrate a disc changing device for a compact disc player in accordance with the present invention. In the drawings, a tray box 1 is supported by a pair of lead screws 8 which can be rotated by a lifting mechanism (not shown). A door member 2 is disposed in the interior of the tray box 1. A plurality of trays 5 are also disposed in the tray box 1 such that they are stacked on one another. The trays 5 are positioned at the front portion of the door member 2. Positioned at the rear portion of the door member 2 is a deck 4 which constitutes a part of the compact disc player. In front of the tray box 1, is a front panel 7. The front panel 7 has an opening through which the door member 2 can be ejected out of the tray box see FIG. 7A–7D.

Figure 5:
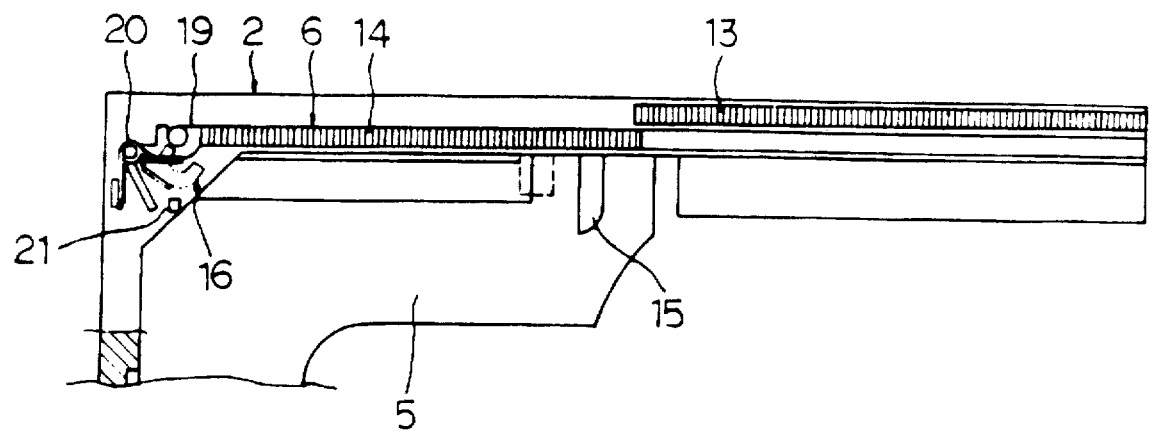
FIG. 5 is a partial bottom view illustrating various constituting elements of the disc changing device along with the door member.

The door member 2 has a pair of facing guides 18 respectively provided at both inner side surfaces of the door member 2. The guides 18 extend longitudinally from the front portion of door member 2, where the stacked trays 5 are disposed, so that they can guide a selected one of the trays 5 to the deck 4. The door member 2 is also provided with sliding grooves 12 at its inner side and lower surfaces, respectively. A movable member 6 is coupled to the door member 2 such that both side edges thereof are received in the sliding grooves 12 provided at both inner side surfaces of the door member 2. The movable member 6 can slide along the sliding grooves 12 to horizontally move a selected one of trays 5. The door member 2 is also provided at its lower surface with a rack 13 for receiving power from a motor 9 to eject a compact disc 3 contained in the tray box 1 forwardly of the front panel 7. The rack 13 extends from a nearly central portion of the door member 2 to a rear end of the door member 2. When the door member 2 is ejected forwardly of the front panel 7 to change the compact disc 3, the tray 5 is also ejected together with the movable member 6 while carrying the compact disc 3. In order to keep the tray 5 at a locked state on the door member 2 during its ejection, a locking member 16 for locking the movable member 6 is mounted, via a hinge to the lower surface of the door member 2, as shown in FIG. 5.

To the motor 9, a driven gear 11 is coupled by means of a gear train 10. The driven gear 11 is selectively engaged with the rack 13 of the door member 2.

The movable member 6 has an engaging portion 15 which protrudes into the interior of the door member 2 such that it can engage with a selected one of trays 5 contained in the tray box 1. The movable member 6 is also provided at its lower surface with a rack 14 for receiving power from the motor 9 to move the selected tray 5 to a desired position. The rack 14 is selectively engaged with the driven gear 11. As shown in FIG. 5, the rack 14 of movable member 6 extends in parallel to the rack 13 of door member 2. The racks 13 and 14 are engaged with the driven gear 11 on the same plane. With such a construction wherein the sliding grooves on the door member, the pair of side edges on the movable member, the first and second racks and the driven gear, all form the means for ejecting a tray from the compact disc player body while a second tray is disposed within the deck and the compact disc player is being operated the movable member 6 can move the selected tray 5 between a loading position defined over the deck 4 and an unloading position defined on the front portion of the door member 2 by the motor 9 which is driven for a predetermined time set by a timer. At the unloading position where all trays are positioned in the tray box 1, the driven gear 11 is engaged with both the trailing end of the rack 14 provided at the movable member 6 and the leading end of the rack 13 provided at the door member 2. This is because the trailing end of the rack 14 overlaps laterally with the leading end of the rack 13. When the motor 9 is further driven in the same direction as that from the loading position to the unloading position, the driven gear 11 disengages from the rack 14 while engaging with the rack 13. On the other hand, when the motor 9 is reversely driven from the unloading position, the driven gear 11 disengages from the rack 13 while engaging with the rack 14. Therefore, both the door member 2 and movable member 6 are not moved together by the rotating force of the driven gear 11 except for instantaneous slight movement occurring when they are engaged together with the driven gear 11 at the unloading position of trays.

The tray box 1 is vertically movable by the rotating force of the lead screws 8. Once the tray box 1 is stopped at the desired vertical position corresponding to a selected one of trays 5 contained therein, the selected tray 5 is engaged with the movable member 6. In this state, the selected tray 5 can be ejected out of the tray box 1 to the outside of the front panel 7 along with the movable member 6 by the door member 2 or moved toward the deck 4 by the movable member 6.

The locking member 16, which is pivotably mounted to the door member 2 to lock the movable member 6, constitutes a part of means for keeping the selected tray 5 at a locked state on the door member 2 during its ejection. This means also includes a biasing member 20 for always urging the locking member 16 toward its locking position at which the movable member 6 is locked on the door member 2.

The locking member 16 is provided at one end thereof with a hook 19 engaging with a protrusion provided at one end of the movable member 6 when the locking member 16 is at its locking position. The locking member 16 also has a lock releasing portion at the other end thereof. When the door member 2 is at its inserted position, the lock releasing portion of locking member 16 is pressed against a stopper 21 protruded from the front panel 7, thereby causing the locking member 16 to assume its lock releasing state against the resilience of the biasing member 20. In the lock releasing state of locking member 16, the hook 19 is disengaged from the protrusion of movable member 6. When the door member 2 is ejected forwardly of the front panel 7, the lock releasing portion of locking member 16 is separated from the stopper 21, thereby causing the locking member 16 to be moved to its locking position by virtue of the resilience of biasing member 20.

The gear train 10 constitutes power transmission means adapted to transmit the power from the motor 9 to the door 2 and movable member 6 in the form of a horizontal moving force while speed-reducing the rotation of motor 9. The driven gear 11 constitutes a part of the gear train 10.

Now, the operation of the disc changing device having the above-mentioned construction according to the present invention will be described in conjunction with FIGS. 7A to 7D.

Figure 7A:
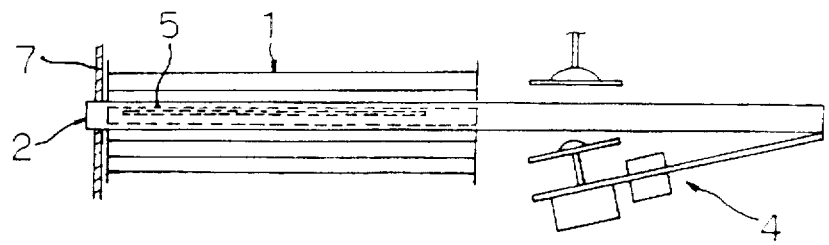
FIGS. 7A to 7D are sectional views respectively illustrating sequential disc change operations of the disc changing device in accordance with the present invention.

FIG. 7A shows the compact disc player in its stopped state. In this state, all trays are positioned in the tray box 1. In other words, there is no tray moved to the loading position over the deck 4 by the movable member 6. In this state, the driven gear 11 is engaged with the rack 14 of movable member 6 while being disengaged from the rack 13 of door member 2.

When one of the various compact discs seated on the trays is selected by the user in the above state, the tray box 1 is vertically moved to the desired position corresponding to the tray containing the selected compact disc by the lead screws 8 which are rotated by the lifting mechanism. See FIG. 1. At this position of the tray box 1, the selected tray is engaged with the engaging portion 15 of movable member 6.

Figure 6:
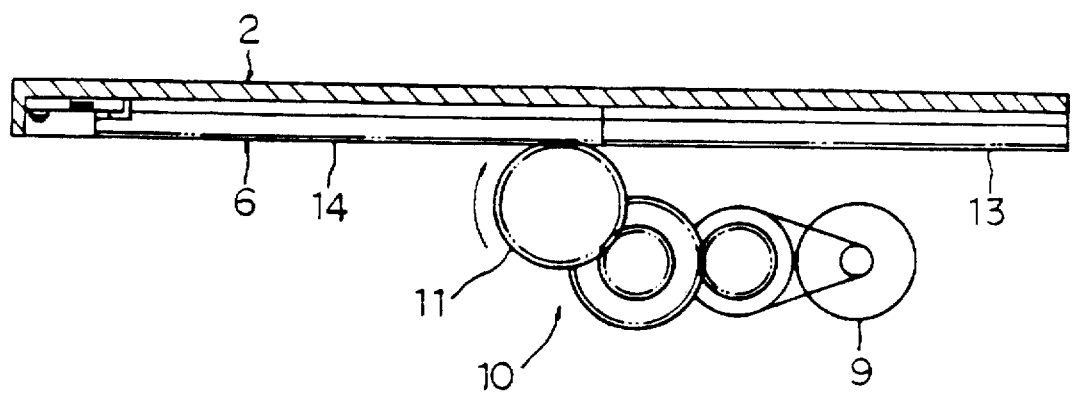
FIG. 6 is a schematic view illustrating a power transmission mechanism included in the disc changing device in accordance with the present invention.
Figure 7B:
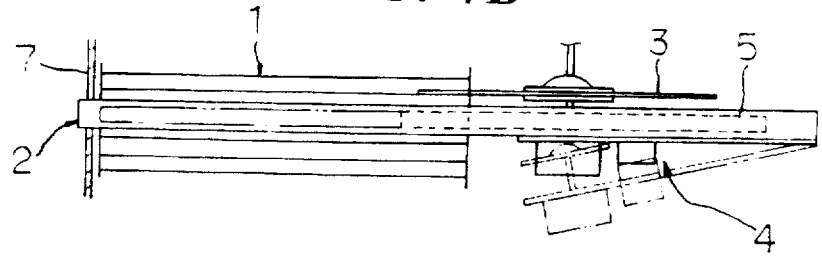

Thereafter, the motor 9 shown in FIG. 6 is driven to rotate the driven gear 11 in the clockwise direction as viewed in FIG. 6. In response to the clockwise rotation of the driven gear 11, the movable member 6 is moved along the sliding grooves 12 because its rack 14 is engaged with the driven gear 11. At this time, the selected tray is moved along with the movable member 6 because it is engaged with the engaging portion 15 of movable member 6, as shown in FIG. 7B. Accordingly, the selected compact disc 3 is moved to the loading position over the deck 4 and then loaded on the deck 4 by a well-known clamping mechanism so that it can be played.

Figure 7C:
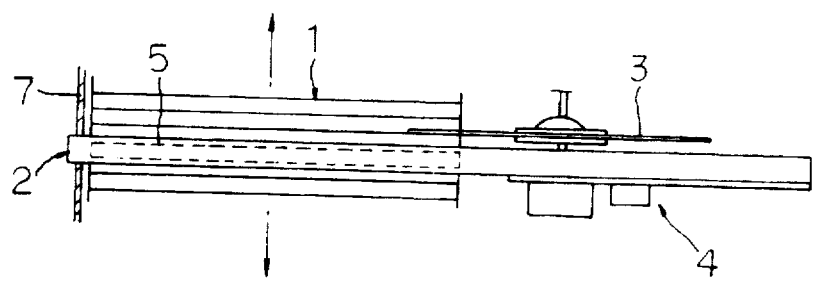

When the motor 9 is reversely driven during the playback of the compact disc 3, the movable member 6 is moved along the sliding grooves 12 toward the front portion of door member 2, namely, the unloading position, while carrying the tray 5 without a disk, as shown in FIG. 7C. Once the movable member 6 reaches the unloading position, the tray is completely inserted into the tray box 1. At the unloading position, the driven gear 11 is engaged with both the trailing end of the rack 14 provided at the movable member 6 and the leading end of the rack 13 provided at the door member 2. In this state, the motor 9 is stopped to wait for a next driving signal.

Figure 7D:
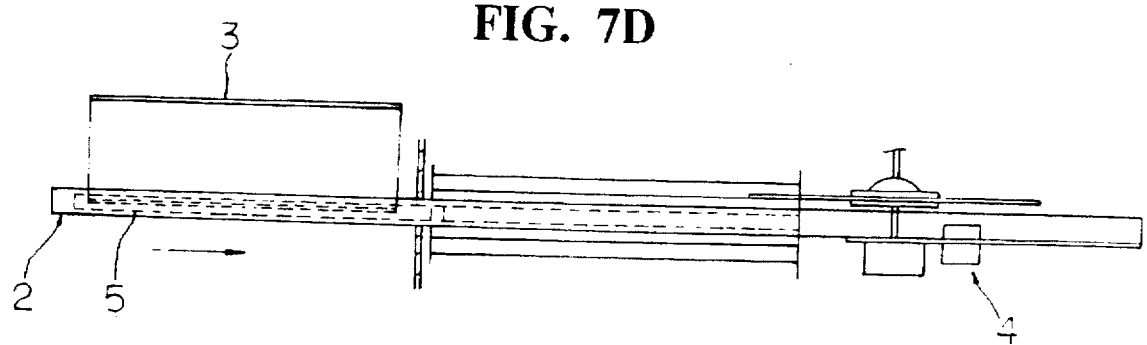

In this condition, the tray box can be vertically moved and then stopped at a selected tray position. When the motor 9 is further driven in the same direction as that from the loading position to the unloading position, the driven gear 11 engages with the rack 13 while disengaging from the rack 14, thereby causing the door member 2 to be moved forwardly of the front panel 7, as shown in FIG. 7D. When the door member 2 is ejected, the lock releasing portion of locking member 16 is separated from the stopper 21, thereby causing the locking member 16 to be moved to its locking position by virtue of the resilience of the biasing member 20. As a result, the hook 19 of locking member 16 locks the movable member 6 on the door member 2. Accordingly, the movable member 6 which is engaged with the selected tray can be ejected along with the door member 2. Since the movable member 6 is locked on the door member 2 during its ejection, the tray 5 is not moved on the door member 2.

When the motor 9 is reversely driven after a new compact disc is seated on the ejected tray, the door member 2 is inserted rearwardly of the front panel 7. Once the tray is completely inserted into the tray box 1, the motor 9 is stopped to wait for a next operation.

After a compact disc 3 is loaded on the deck 4, its tray 5 is moved to the tray box 1 so that the tray box 1 can be vertically moved to select a desired one of trays contained therein. The door 2 is also forwardly ejected to eject the selected tray for a disc change. In accordance with the present invention, all the operations can be carried out while the compact disc 3 is being played. Therefore, the present invention accomplishes a disc change during the playback of a compact disc.

As apparent from the above description, the present invention provides a disc changing device being capable of not only safely storing a plurality of compact discs, but also ejecting a selected one of trays while a compact disc is being played. Accordingly, the user can change a disc while still listening to the music and listen to a new music immediately after the disc change.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A disc changing device for a compact disc player comprising a tray box containing a plurality of stacked trays, the tray box being mounted in a body of the compact disc player such that it is vertically movable, and a door member mounted to the player body such that it can be ejected in a forward direction out of the player body and inserted in a reverse direction into the interior of the player body by a drive power from a motor along with a selected one of the trays to carry out a disc change, wherein the improvement comprises:

the tray box being disposed at a position corresponding to a front portion of the door member when the door member is completely inserted into the player body;

a movable member disposed on the door member such that it is slidable with respect to the door member, the movable member being operative to move a selected one of the trays between the front portion of the door member and a deck of the compact disc player disposed in the reverse direction with respect to the door member;

an ejecting mechanism which ejects a first selected tray out of the player body while a second selected tray is disposed within the deck and the compact disc player is being operated; and means for preventing the tray selected for a disc change operation from moving with respect to the door member when the door member is ejected out of the player body in the forward direction;

wherein the ejecting mechanism which ejects the first selected tray out of the player body while the second selected tray is disposed within the deck and the compact disc player is being operated comprises:

sliding grooves provided on the door member at its inner side surface and lower surface respectively, and having a pair of facing guides provided respectively at a pair of inner side surfaces of the door member, wherein said pair of facing guides extend longitudinally from the front portion of the door member in order to guide the selected one of the trays to the deck;

a pair of side edges provided on the movable member and coupled to the door member such that the side edges are received in the sliding grooves provided at the inner side surfaces of the door member, such that the movable member can slide along the sliding grooves to horizontally move the selected one of the trays;

a first rack provided at the lower surface of the door member for receiving power from the motor to eject a compact disc contained in the tray box forwardly of an opening in a front panel of the tray box, said first rack extending from a nearly central portion of the door member to a rear end of the door member;

a second rack provided at the lower surface of the movable member and extending in parallel to said first rack of the door member, for receiving power from the motor to move the selected one of the trays in a reverse direction from the front panel of the tray box and toward the deck of the compact disc player;

a driven gear coupled to the motor by a gear train;

wherein the driven gear is disengaged from the first rack and engaged with the second rack to move the movable member along the sliding grooves in a reverse direction toward the deck when loading another compact disc;

wherein the driven gear engages with both a trailing end of the second rack provided at the movable member and with a leading end of the first rack provided at the door member, to move the movable member along the sliding grooves toward a front portion of the door member during playback of a selected compact disc; and wherein the driven gear engages with the first rack while disengaging from the second rack, causing the door member to move forwardly of the front panel of the tray box upon election of the compact disc.

2. The disc changing device in accordance with claim 1, wherein the means for preventing the tray selected from moving with respect to the door member comprises:

a locking member with a hook at an end thereof, said locking member being pivotably mounted on the door member and operative to engage a protrusion provided at one end of the movable member and lock said movable member at the front portion of the door member when the door member is ejected;

a biasing member for biasing the locking member to a position in which the movable member is in a locked state;

lock releasing means for releasing the locked state of the locking member when the door member is completely inserted into the interior of the player body.

3. The disc changing device in accordance with claim 1, wherein the door member and the movable member each have a rack disposed thereon which is selectively engaged with the driven gear coupled to the motor to move the door member and the movable member, respectively.

4. The disc changing device in accordance with claim 3, wherein the rack provided on the movable member has a front end that is engaged with the driven gear when the movable member is positioned proximate the deck of the compact disc player and a rear end that is engaged with the driven gear when the movable member is positioned at the front portion of the door member when the door member is completely inserted into the interior of the player body.

5. The disc changing device in accordance with claim 3, wherein the rack provided on the door member has a front end that is engaged with the driven gear when the door member is completely inserted into the interior of the player body and a rear end that is engaged with the driven gear when the door member is completely ejected.

6. The disc changing device in accordance with claim 3, wherein both of the racks are engaged with the driven gear when the movable member is positioned at the front portion of the door member and the door member is completely inserted into the interior of the player body.

* * * * *